A. SIEMIENSKI.
BOLT AND NUT LOCK.
APPLICATION FILED APR. 23, 1913.
1,080,175.
Patented Dec. 2, 1913.
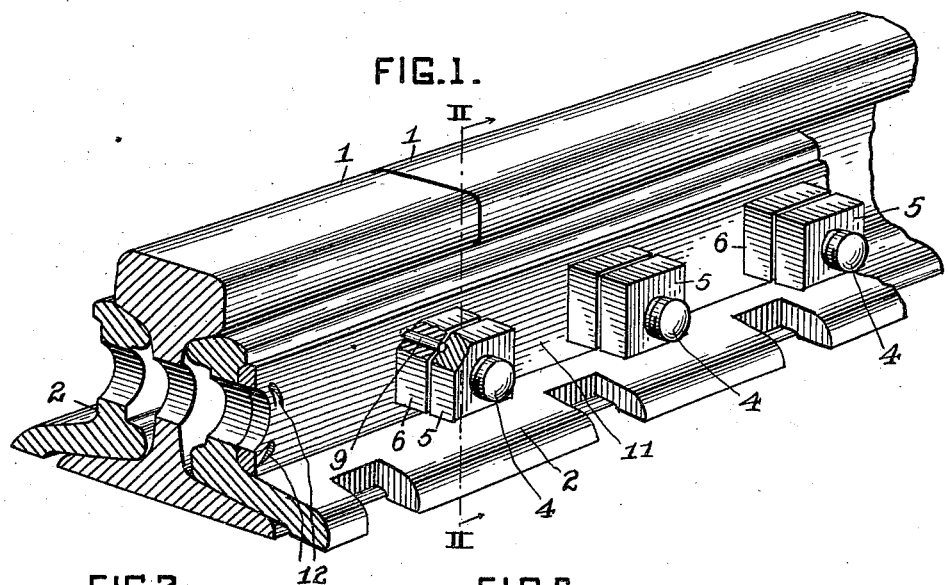
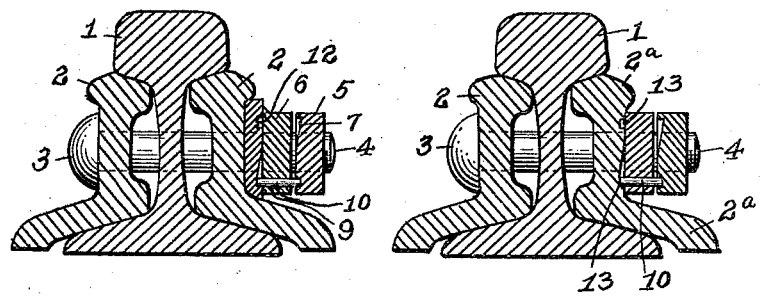
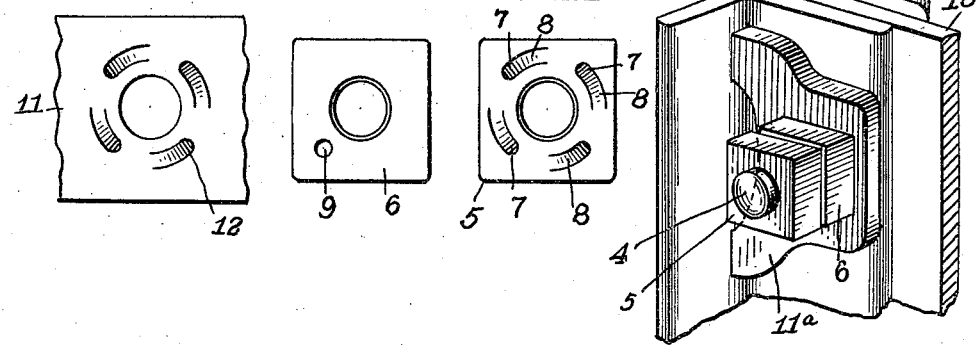
WITNESSES
J. Herbert Bradley.
Lois Wineman.
INVENTOR
Adam Siemienski
by W. G. Doolittle

UNITED STATES PATENT OFFICE.

ADAM SIEMIENSKI, OF GLASSPORT, PENNSYLVANIA, ASSIGNOR OF ONE-HALF TO FRANK A. PIEKARSKI, OF PITTSBURGH, PENNSYLVANIA.

BOLT AND NUT LOCK.

1,080,175.   Specification of Letters Patent.   Patented Dec. 2, 1913.

Application filed April 23, 1913. Serial No. 763,036.

*To all whom it may concern:*

Be it known that I, ADAM SIEMIENSKI, a citizen of the United States, residing at Glassport, in the county of Allegheny and State of Pennsylvania, have invented certain new and useful Improvements in Bolt and Nut Locks, of which the following is a specification.

The prime object of my invention is to provide a new and improved nut lock.

In the accompanying drawing, which illustrates applications of my invention: Figure 1 is a perspective view showing the ends of two adjacent rails, portions of the usual fish plates, and my invention applied thereto; Fig. 2 is a vertical sectional view taken on line II—II of Fig. 1; Fig. 3 is a view similar to Fig. 2 showing a modified form of my invention; Figs. 4, 5, and 6 are detailed face views, respectively, of a plate member and two nuts employed in the preferred form of my construction; and Fig. 7 is a perspective view showing a still further modified form of my invention.

Referring to the drawings, and first to the form of Fig. 1, 1—1 designate the meeting ends of two adjacent rails, and 2 the usual form of fish plates employed. 3 designates a bolt of the usual construction having a threaded shank portion 4. Shank portion 4 is adapted to receive two nuts or members, hereinafter referred to as the outer or primary nut 5 and the inner of secondary nut 6. Nut 5, on its inner face, is provided with a plurality of depressions or pockets 7 preferably arranged in a circular row on the inner face, and each depression or pocket having a slightly inclined groove 8 leading thereto. The inner or secondary nut 6 is provided with a hole or passage 9 extending therethrough, said hole or passage being adapted to receive a movable pin 10, said pin 10 is of slightly greater length than the hole or passage in which it is entered, thereby permitting the ends to project slightly from both faces of the nut 6. While I have illustrated the nut 6 provided with one hole only, said nut may have two or more passages 9 each adapted to have entered therein a pin 10.

In the form of Fig. 1, I have shown a series of bolts with nuts 5 and 6 mounted thereon, and in addition thereto, have shown a single fixed plate member 11 provided with a series of openings through which the bolts pass. This plate member 11 is adapted to be mounted on the several bolts, and has a fixed bearing on one of the fish plates. In place of employing a single plate member 11, each bolt may be provided with a separate plate member, as for example, the plate member 11$^a$ shown by Fig. 7, or the fixed plate member 11 may be of a different form than the two forms shown without departing from my invention; or it may be omitted altogether as shown in the form of my invention illustrated by Fig. 3. The plate member 11 is provided with a series of depressions or pockets 12 corresponding with the depressions or pockets formed on the inner face of the outer nut 5. As the outer nut 5 is tightened on the bolt, it will force the movable pin inwardly and into engagement with one of the depressions or pockets 12 of member 11, and at the same time, the projecting end of the pin adjacent to the inner end of face 5 will enter one of the pockets or depressions 7 of said nut 5, thereby securely maintaining the nut 5 from rotation on the bolt.

In the form of Fig. 3, which omits the fixed plate member 11, I form, as shown, a fish plate 2$^a$ with a series of pockets or depressions 13 adapted to have the inner end of the movable pin entered therein as the nuts are forced inwardly, thereby locking the nut 5 against rotation in the same manner as above described.

In the form of my invention illustrated by Fig. 7, I have shown an application of my invention in connection with two angle beams 14 and a member 15 through which the bolt is passed. In this form of my invention, the fixed plate member 11$^a$ has a bearing on one of the angle members as clearly shown by the drawing.

What I claim is:

In a nut lock, the combination with a bolt, two coacting nuts mounted thereon with the outer nut having its inner face provided with a series of depressions or pockets, the inner nut having a hole or passage extending therethrough, a movable pin entered in said hole and projecting therefrom, and a fixed member adjacent to the inner face of the inner nut, said fixed member having a depression or pocket on its outer face, said movable pin adapted to coact with the outer nut and the fixed member.

In testimony whereof I affix my signature in presence of two witnesses.

ADAM SIEMIENSKI. [L. S.]

Witnesses:
W. G. DOOLITTLE,
F. A. PIEKARSKI.

Copies of this patent may be obtained for five cents each, by addressing the "Commissioner of Patents, Washington, D. C."